(12) United States Patent
Berger et al.

(10) Patent No.: US 12,094,139 B2
(45) Date of Patent: Sep. 17, 2024

(54) SYSTEMS AND METHODS FOR ENHANCED DEPTH DETERMINATION USING PROJECTION SPOTS

(71) Applicant: Magic Leap, Inc., Plantation, FL (US)

(72) Inventors: Kai Berger, Lake Forest, CA (US); Hasnain Salim Vohra, Los Angeles, CA (US)

(73) Assignee: MAGIC LEAP, INC., Plantation, FL (US)

(*) Notice: Subject to any disclaimer, the term of this patent is extended or adjusted under 35 U.S.C. 154(b) by 878 days.

(21) Appl. No.: 16/952,516

(22) Filed: Nov. 19, 2020

(65) Prior Publication Data

US 2021/0158552 A1    May 27, 2021

Related U.S. Application Data

(60) Provisional application No. 62/939,454, filed on Nov. 22, 2019.

(51) Int. Cl.
| | |
|---|---|
| *G06K 9/00* | (2022.01) |
| *G06T 7/521* | (2017.01) |
| *G06T 7/557* | (2017.01) |
| *G06T 7/586* | (2017.01) |
| *G06T 15/10* | (2011.01) |
| *G06T 19/00* | (2011.01) |

(52) U.S. Cl.
CPC ............ *G06T 7/521* (2017.01); *G06T 7/557* (2017.01); *G06T 7/586* (2017.01); *G06T 15/10* (2013.01); *G06T 19/006* (2013.01)

(58) Field of Classification Search
CPC ......... G06T 7/521; G06T 7/586; G06T 7/557; G06T 15/10; G06T 19/006
See application file for complete search history.

(56) References Cited

U.S. PATENT DOCUMENTS

| | | | |
|---|---|---|---|
| 6,850,221 B1 | 2/2005 | Tickle | |
| 8,786,682 B2* | 7/2014 | Shpunt | G06V 10/145 353/70 |
| 2006/0028436 A1 | 2/2006 | Armstrong | |
| 2007/0081123 A1 | 4/2007 | Lewis | |

(Continued)

OTHER PUBLICATIONS

Grundhöfer, Anselm, and Daisuke Iwai. "Recent advances in projection mapping algorithms, hardware and applications." Computer graphics forum. vol. 37. No. 2. 2018. (Year: 2018).*

(Continued)

*Primary Examiner* — Avinash Yentrapati
(74) *Attorney, Agent, or Firm* — Seed IP Law Group LLP

(57) ABSTRACT

Systems and methods for enhanced depth determination using projection spots. An example method includes obtaining images of a real-world object, the images being obtained from image sensors positioned about the real-world object, and the images depicting projection spots projected onto the real-world object via projectors positioned about the real-world object. A projection spot map is accessed, the projection spot map including information indicative of real-world locations of projection spots based locations of the projection spots in the obtained images. Location information is assigned to the projection spots based on the projection spot map. Generation of a three-dimensional representation of the real-world object is caused.

14 Claims, 13 Drawing Sheets

(56) References Cited

U.S. PATENT DOCUMENTS

| | | |
|---|---|---|
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Berger, et al., "Markerless Motion Capture using multiple Color-Depth Sensors," Vision, Modeling, and Visualiztion (2011), The Eurographics Association.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Schröder, "Super Resolution for Active Light Sensor Enhancement," Bachelor Thesis, Computer Graphics Lab, TU Braunschweig, Mar. 4, 2012.

Tanriverdi and Jacob, "Interacting With Eye Movements In Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

SYSTEMS AND METHODS FOR ENHANCED DEPTH DETERMINATION USING PROJECTION SPOTS

CROSS-REFERENCE TO RELATED APPLICATIONS

This application claims priority to U.S. Prov. App. No. 62/939,454 titled "SYSTEMS AND METHODS FOR ENHANCED DEPTH DETERMINATION USING PROJECTION SPOTS" and filed on Nov. 22, 2019, the disclosure of which is hereby incorporated herein by reference in its entirety.

BACKGROUND

Field

The present disclosure relates to estimating depth and, more particularly, to estimating depth using infrared radiation (IR) projectors.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an AR scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

SUMMARY

According to some embodiments, a method implemented by a system of one or more computers is described. The method includes obtaining a plurality of images of a real-world object, the images being obtained from a plurality of image sensors positioned about the real-world object, and the images depicting projection spots projected onto the real-world object via a plurality of projectors positioned about the real-world object; accessing a projection spot map, the projection spot map including information usable to determine real-world locations of projection spots based on depictions of the projection spots in the obtained images; assigning location information to the projection spots based on the projection spot map; and causing generation of a three-dimensional representation of the real-world object.

According to some embodiments, a system comprising one or more processors and non-transitory computer storage media storing instructions is described. The instructions are executed by the one or more processors to perform operations comprising obtaining a plurality of images of a real-world object, the images being obtained from a plurality of image sensors positioned about the real-world object, and the images depicting projection spots projected onto the real-world object via a plurality of projectors positioned about the real-world object; accessing a projection spot map, the projection spot map including information usable to determine real-world locations of projection spots based on depictions of the projection spots in the obtained images; assigning location information to the projection spots based on the projection spot map; and causing generation of a three-dimensional representation of the real-world object.

According to some embodiments, non-transitory computer storage media storing instructions is described. The instructions are executed by a system of one or more computers which cause the one or more computers to perform operations comprising obtaining a plurality of images of a real-world object, the images being obtained from a plurality of image sensors positioned about the real-world object, and the images depicting projection spots projected onto the real-world object via a plurality of projectors positioned about the real-world object; accessing a projection spot map, the projection spot map including information usable to determine real-world locations of projection spots based on depictions of the projection spots in the obtained images; assigning location information to the projection spots based on the projection spot map; and causing generation of a three-dimensional representation of the real-world object.

In the above embodiments, the projection spots are infrared radiation (IR) projection spots. The projection spot map includes information indicative of real-world locations of projection spots based on depictions of the projection spots in the obtained images, and wherein a depiction of a first projection spot comprises shape information, position information, and/or angle information, associated with image pixels which form the first projection spot. Each projection spot represents an intersection of a cone of light projected by a projector with the real-world object. The projection spot map is based on geometric information associated with each cone of light. Geometric information includes an origin associated with each cone of light at a projector and a direction associated with projection. Geometric information for a first cone of light includes a vector centered at an origin of a projector which is configured to project the first cone of light, the vector defining propagation of the first cone of light. Assigning location information to a first projection spot depicted in a first image comprises: identifying first pixels of the first image which depict the first projection spot; and identifying, based on the projection spot map and size, information indicative of a distance traveled by a cone of light associated with the first projection spot, and wherein the assigned location information is based on the indicated distance. Identifying information indicative of the distance is based on a size associated with the first pixels. The first image is obtained from a first image sensor, and wherein the projection spot map indicates, for the first image sensor, that the first image pixels are configured to depict a projection spot of the identified size at the indicated distance. The first pixels depict the first projection spot according to a Gaussian function. The Gaussian function is centered at a main axis of a cone of light which forms the first projection spot, the cone of light being output by a first projector. A location assigned to the first projection spot is based on the indicated distance and camera parameters associated with the first image sensor. Camera parameters comprise intrinsic and extrinsic parameters. The projection spot map indicates absolute distances associated with each projection spot. Assigning a location to a first projection spot depicted in a first image obtained from a first image sensor comprises: identifying one or more pixels in the first image which form the first projection spot; identifying, for the first image sensor and the identified pixels, location information for the first projection spot based on the projection spot map. The assigned location information represents, at least, depth information for a surface of the real-world object. Each projection spot depicted in an image represents an intersection of a respective cone of light from a respective projector with a portion of the surface of the real-world object. The assigned location information represents respective depths for each portion on which a respective cone of light is projected. The method or operations further comprise identifying an orientation associated with each portion. Identifying an orientation associated with a first portion on which a first cone of light is projected comprises identifying a shape associated with a first projection spot associated with the first cone of light, the first projection spot being depicted in one or more pixels of an image; identifying, based on the shape, the orientation of the first portion. A shape comprises a circle or an ellipse.

In some embodiments, a method performed by a system of one or more computers is described. The method includes obtaining, via an image sensor, images of a calibration board, the calibration board being positioned at a plurality of distances relative to a projector outputting a plurality of projection spots, the projection spots including a first projection spot; identifying respective three-dimensional positions associated with each depiction of the first projection spot in the obtained images; determining geometric information associated with a cone of light projected by the projector which forms the first projection spot in each of the plurality of images; and generating a projection spot map which indicates, at least, information usable to determine a real-world location of the first projection spot as depicted in an image obtained by the image sensor.

According some embodiments, a system comprising one or more processors and non-transitory computer storage media storing instructions is described. The instructions are executed by the one or more processors to perform operations comprising obtaining, via an image sensor, images of a calibration board, the calibration board being positioned at a plurality of distances relative to a projector outputting a plurality of projection spots, the projection spots including a first projection spot; identifying respective three-dimensional positions associated with each depiction of the first projection spot in the obtained images; determining geometric information associated with a cone of light projected by the projector which forms the first projection spot in each of the plurality of images; and generating a projection spot map which indicates, at least, information usable to determine a real-world location of the first projection spot as depicted in an image obtained by the image sensor.

According to some embodiments, non-transitory computer storage media storing instructions is described. The instructions are executed by a system of one or more computers which cause the one or more computers to perform operations comprising obtaining, via an image sensor, images of a calibration board, the calibration board being positioned at a plurality of distances relative to a projector outputting a plurality of projection spots, the projection spots including a first projection spot; identifying respective three-dimensional positions associated with each depiction of the first projection spot in the obtained images; determining geometric information associated with a cone of light projected by the projector which forms the first projection spot in each of the plurality of images; and generating a projection spot map which indicates, at least, information usable to determine a real-world location of the first projection spot as depicted in an image obtained by the image sensor.

In the above embodiments, the method or operations further include determining geometric information associated with cones of light projected by the projector which form a remaining of the plurality of projection spots. The projection spot map indicates information usable to determine real-world locations of the plurality of projection spots as depicted in images obtained by the image sensor. The three-dimensional positions represent three-dimensional positions in a real-world coordinate system. Identifying a three-dimensional position associated with a depiction of the first projection spot comprises: identifying a two-dimensional position associated with the first projection spot; and based on camera parameters associated with the image sensor, identifying the three-dimensional position. Geometric information includes an origin associated with the cone of light at the projector and a direction associated with projection. Geometric information for the cone of light includes a vector centered at an origin of the projector, the vector defining propagation of the cone of light. Determining geometric information comprises: fitting a line through a center of the three-dimensional positions associated with each depiction of the first projection spot, the line defining an axis of the cone of light.

DETAILED DESCRIPTION

Figure 1:
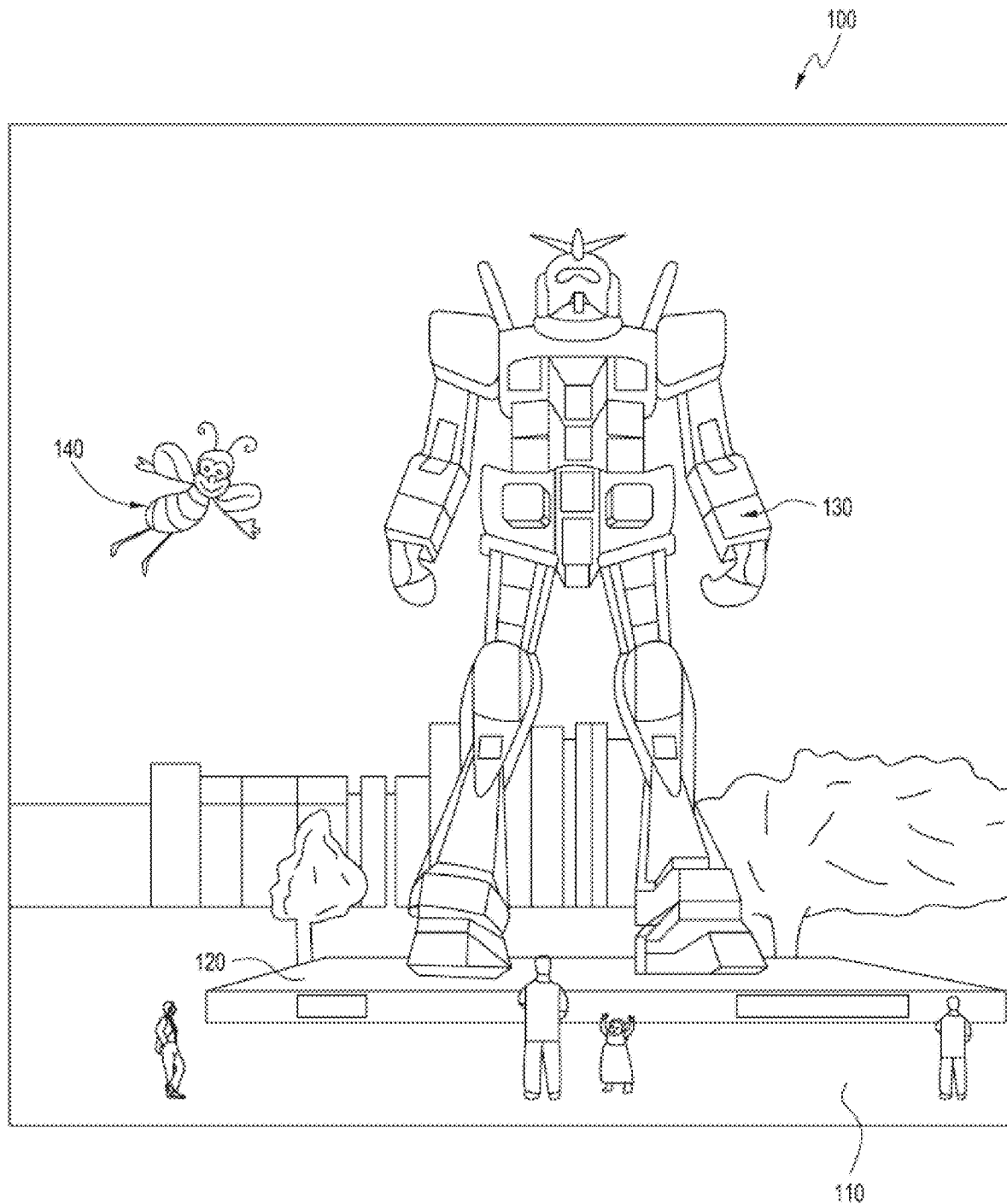
FIG. 1 illustrates a user's view of augmented reality (AR) through an AR device.

In virtual or augmented reality scenes, realism of the scenes may be enhanced via accurate representations of presented virtual objects. For example, an augmented reality scene may include a virtual object depicting a certain object known to a user. In this example, the virtual object may be a particular cup. Since the user may know the appearance of the cup, any deviation of the virtual object from the real-world cup may reduce realism of the augmented reality scene. As another example, AR scene 10 depicts a robot statue 40. It may be appreciated that the robot statue 40 may represent a particular robot which is known to a user. Thus, an accurate representation of the particular robot may improve a user experience of the AR scene 10.

This specification describes improved techniques to generate three-dimensional representations of real-world objects. Example three-dimensional representations may include three-dimensional models, such as meshes, point clouds, and so on. A real-world object may include any object capable of being imaged by image sensors (e.g., cameras). For example, real-world objects may include persons, house-hold items, industrial items, and so on. Advantageously, the techniques described herein may allow for improved accuracy of mapping depth with respect to a real-world object. Thus, a resulting three-dimensional representation may more closely adhere to volumetric characteristics of the real-world object as compared to prior techniques. Additionally, and as will be described, the techniques described herein may reduce a complexity associated with a layout of hardware required to generate a three-dimensional representation.

Example Stereoscopic Techniques

Commonly, a volumetric capture stage may be employed as part of a process to generate a three-dimensional representation of a real-world object. An example volumetric capture stage may include a multitude of stereo cameras positioned about the stage. These stereo cameras may optionally be pointing at a same portion of the stage on which the real-world object is placed for capturing. Thus, the stereo cameras may obtain images of a real-world object placed within the volumetric capture stage. In this way, the stereo cameras may obtain respective pairs of stereo images which depict respective views of the real-world object. Using these pairs of stereo images, depth information for the real-world object may be determined. This depth information may then be used, at least in part, to generate a three-dimensional representation of the real-world object.

As described above, pairs of stereo images may be used to inform depth of a real-world object. For example, a system may perform a correspondence matching process between pairs of stereo images. As an example, the system may obtain a first image from a first stereo camera and a second image from a corresponding second stereo camera. The system may then identify a first point in the first image which is determined to be the same as a second point in the second image. Thus, the first point and the second point may correspond to a same location in three-dimensional space. The first image and second image may provide a different perspective of this same location (e.g. point). Based on camera parameters described below, the system may determine three-dimensional coordinate information for the location (e.g., using photogrammetry techniques). The resulting three-dimensional coordinate information may thus represent three-dimensional real-world coordinates or three-dimensional camera coordinates.

In the above-described technique, the stereo cameras may be calibrated to determine camera parameters. For example, intrinsic and extrinsic camera parameters may be obtained. Example intrinsic parameters may include focal length, image sensor format, principal point, and so on. Example extrinsic parameters may enable translation between real-world coordinates and camera coordinates, such as a location of a center of a camera, the camera's heading, and so on.

An example technique leveraging stereo images may use patches obtained from the stereo images. For example, a system may determine measures of similarity between patches included in pairs of stereo images. For patches which are determined to match, the system may determine depth information. Another example technique may identify specific features in pairs of stereo images. As an example, a first stereo image may include a particular letter (e.g., 's') and a second stereo image may also include the particular letter. A system may therefore match the particular letter in the first image and second image. Based on this match, the system may identify that the particular letter corresponds to a same location in three-dimensional space.

The above-described stereoscopic techniques may thus determine depth information between a pair of stereo images. However, this technique introduces inaccuracies when generating a three-dimensional representation of a real-world object. For example, any slight deviation to an established alignment of the stereo cameras may introduce inaccuracy with respect to determined depth information for the real-world object. Additionally, stereoscopic techniques may introduce ambiguity. For example, a real-world object may include a particular letter (e.g., s') on the object. A system may attempt to match this particular letter between pairs of stereo images. However, this matching process may be imprecise such that the system may incorrectly identify a first instance of the particular letter as corresponding with a second, different, instance of the particular letter in a respective pair of stereo images. For example, there may be multiple instances of the particular letter and the system may incorrectly match the instances between a pair of stereo images. For example, the object may have the word Mississippi on it and the system may incorrectly match the first s with the third s, and thus calculate an incorrect depth location for that s. In this way, the system may determine inaccurate depth information.

Since stereoscopic techniques rely upon a system to match locations between pairs of stereo images, any faulty matches, or ambiguities in the images, may reduce an accuracy of the depth determination. Certain systems may attempt to resolve these faulty matches or ambiguities at a later stage in a processing pipeline. For example, the system may fit a best surface based on different images from different pairs of stereo images. Since faulty matches or ambiguities may be expected with these techniques, a processing pipeline may require additional complexities to ensure accuracy of determined depth information. This may require more substantial processing resources and, with respect to battery powered systems, may reduce a battery life of the systems.

Additionally, stereoscopic techniques may have difficulty determining depth for a real-world object which is substantially plain (e.g., lacking in uniqueness or texture). For example, a system may have difficulty determining accurate depth of a plain white shirt. In this example, the plain white shirt may have substantially similar features or patches between pairs of stereo images. Thus, a system may have difficulty accurately matching locations within the pairs of stereo images. In an effort to address these deficiencies with stereoscopic techniques, an infrared radiation (IR) projector may be used (e.g. added to the system). For example, an IR projector may output a particular pattern of IR projection spots. This pattern may represent a repetition of projection spots, such as a 3×3 pattern, which form the larger pattern. In some examples, there may be thousands or more IR projection spots which are projected onto a real-world object. The IR projection spots may be used to add texture to the real-world object. For example, the IR projection spots may be projected onto the plain white shirt described above. In this way, a system may more readily match locations within pairs of stereo images via matching the projection spots between the pairs of stereo images. For example, a system may use an algorithm or process to match projection spots within a local neighborhood of spots, such as within the 3×3 pattern described above.

However, even with an IR projector, stereoscopic techniques may introduce error. For example, there may still be errors associated with matching IR projection spots between pairs of stereo images. Additionally, the determined depth is relative to the pairs of stereo cameras. At least these example deficiencies may be addressed according to the techniques described herein.

Enhanced Depth Determination Using Infrared Radiation (IR) Projectors

In some embodiments described herein, a multitude of IR projectors may be positioned about a real-world object. For example, a first IR projector may be positioned to a left of a real-world object. In this example, a second IR projector may be positioned facing the real-world object. Optionally, a third IR projector may be positioned to a right of the real-world object. Each IR projector may output light forming a multitude of projection spots, for example according to a pattern. It may be appreciated that IR projection spots may thus be projected on substantially all of the surfaces of the real-world object. Image sensors, such as cameras, may be similarly positioned about the real-world object. These image sensors may obtain images of the real-world object with the IR projection spots projected thereon (hereinafter referred to as 'projection spots').

Advantageously, the techniques described herein may not rely upon stereoscopic cameras to inform depth. Instead, a system described herein may directly determine a real-world location (e.g. 3D point in space), associated with each projection spot included in images of the real-world object. For example, the system may assign respective location information (e.g., depths, three-dimensional coordinates, and so on) to each of the projection spots. An assigned depth, in this specification, may represent a particular distance in a real-world or camera coordinate system. In some embodiments, a depth may represent a z-coordinate. Subsequently the associated depth helps locating each particular spot in 3D, when a camera calibration is provided. The system may The assigned depths may, as will be described, represent absolute depths (such as a distance from the imaging device to the particular projection spot or a distance relative to some anchor point). Thus, the system may not be required to match projection spots between images (e.g. using stereoscopic techniques). In this way, the system may avoid deficiencies associated with inaccurate matching of locations between images. Instead, the system may use a size and/or position of each projection spot depicted in an image to precisely assign a depth to the projection spot. Based on assigned depths for projection spots projected on a real-world object, the system may generate a corresponding three-dimensional representation. For example, the system may determine depth information, such as one or more depth maps, for a surface of the real-world object.

While this specification describes use of IR projectors, it may be appreciated that other projectors may be used. For example, certain projectors may output a pattern of projection spots in visible wavelengths. In this example, the system described herein may assign respective depths to each of the projection spots. When generating a three-dimensional representation of a real-world object, the system may remove the visible projection spots from images of the real-world object. For example, the system may identify that the projection spots fall within a particular wavelength range. In this example, the system may perform a process to remove projection spots which fall within the particular wavelength range. The system may optionally use one or more images of the real-world object without projection spots thereon to generate the three-dimensional representation. Additional projectors may include ultraviolet (UV) projectors, and so on.

To accurately assign a depth to a projection spot included in an image, the system may determine a mapping between projection spots and image pixels of an image (hereinafter referred to as a 'projection spot map'). As will be described, the projection spot map may enable an assignment of a depth, or real-world location, to any projection spot depicted in an image from any of the image sensors described above.

To determine the projection spot map, a calibration process may be performed. To perform the calibration process, which is described in FIGS. 3A-5 below, the system may determine geometric information associated with each projection spot. Example geometric information may indicate how the projection spot is projected through space, such as a vector with an origin at a particular location in three-dimensional space. The origin may optionally reflect a position on an IR projector. As may be appreciated, each projection spot depicted in an image may represent an intersection of a real-world object with a cone of light projected from a particular location on the IR projector. The cone of light may be formed from divergence of coherent light projected by an IR projector. For example, diffraction gratings, lenses, and so on, may cause light provided by the IR projector to outwardly diverge. Thus, the system may determine geometric information associated with each cone of light. In this way, the system may determine information usable to trace each cone of light formed from an initial location on the IR projector to an arbitrary location in three-dimensional space. At any distance from the IR projection, a position and/or size of a projection spot formed from an intersection of an associated cone of light with a real-world object may be determined.

Additionally, the system may determine how each image sensor depicts projection spots associated with a same cone of light. The system may therefore identify, for any arbitrary distance from an IR projector, which image pixels associated with each image sensor will depict an intersection of the cone of light at the arbitrary distance. Since the image sensors may be positioned about the real-world object, each image sensor may provide a particular view or vantage point of a real-world object. The system may therefore determine, for a certain distance from an IR projector, which image pixels associated with the image sensors will depict the resulting projection spot at the certain distance.

The projection spot map may indicate that if a certain image from a certain image sensor depicts a projection spot using image pixels, then a depth or real-world location may be assigned to the projection spot. It may be appreciated that the depiction of the projection spot with a certain size and position, determined from the image pixels, may only be possible if the projection spot intersects with a real-world object at the depth or real-world location.

In some embodiments, to determine the projection spot map, each of the image sensors may be calibrated. For example, intrinsic parameters of the image sensors may be obtained. These intrinsic parameters may represent a transformation from the three-dimensional camera's coordinate system into two-dimensional coordinates of image pixels in an image. Additionally, extrinsic parameters of the image sensor may be obtained. These extrinsic parameters may represent a transformation from the three-dimensional real-world coordinate system to the three-dimensional camera's coordinate system.

In contrast to prior techniques, the system may assign an absolute depth, or real-world location, to each projection spot depicted in an image. Thus, the system may avoid ambiguities with respect to stereoscopic imaging techniques. Additionally, the system may employ a less complex processing pipeline. As described above, stereoscopic techniques may require resolution of ambiguities or incorrect matches between stereo image pairs. In contrast, the technique described herein allows for a precise assignment of depth/location based on geometric underpinnings of an IR projector in a pre-calibrated space. In this way, a resulting three-dimensional representation of an object may benefit from the precise depth mapping scheme described herein. Additionally, processing requirements may be reduced and a battery life, for a battery powered system, may be increased.

Reference will now be made to the drawings, in which like reference numerals refer to like parts throughout. Unless indicated otherwise, the drawings are schematic and not necessarily drawn to scale.

Figure 2:
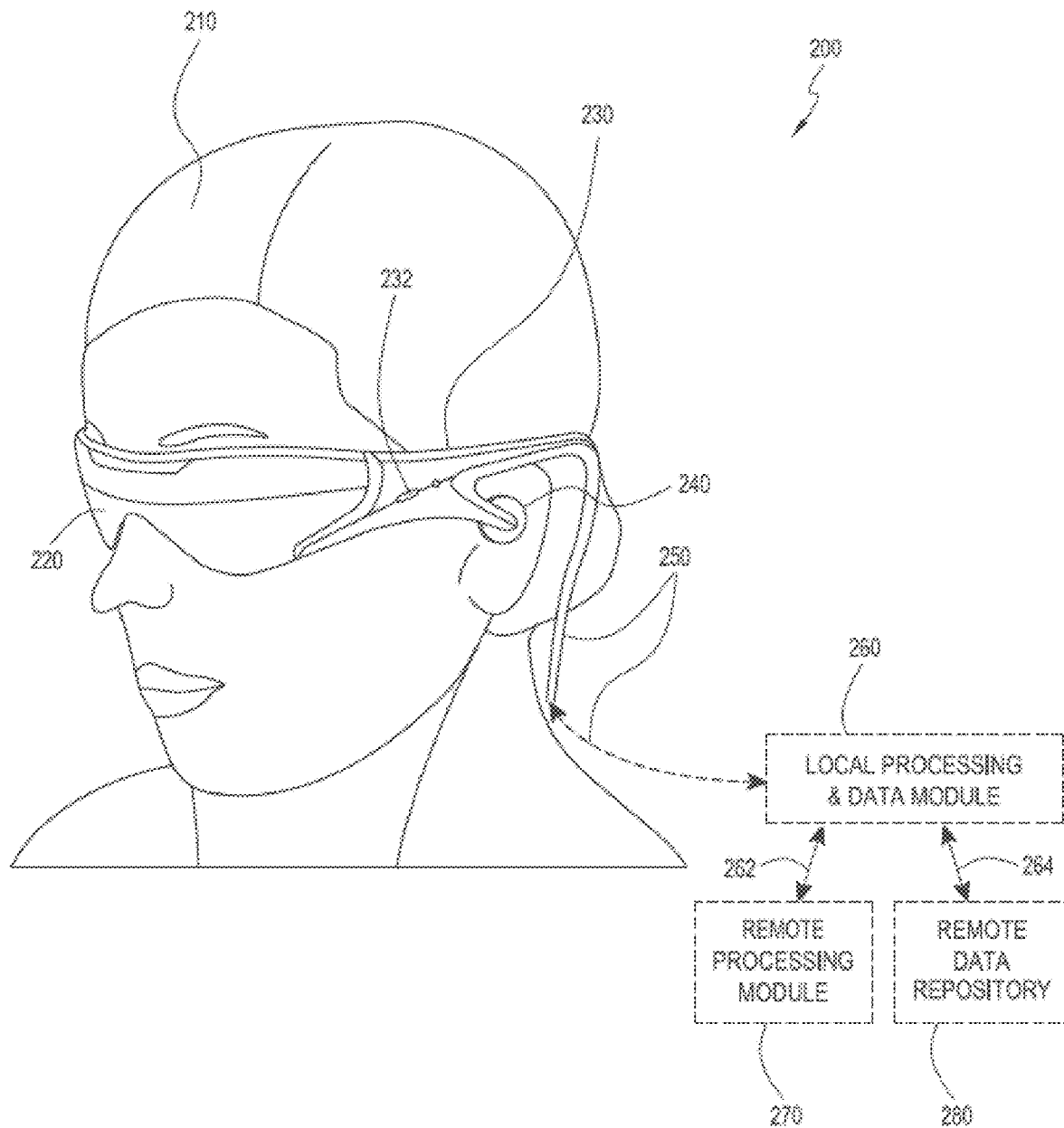
FIG. 2 illustrates a conventional display system for simulating three-dimensional imagery for a user.

FIG. 2 illustrates an example of wearable system 200 which can be configured to provide an AR/VR/MR scene. The wearable system 200 can also be referred to as the AR system 200 or the wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some implementations, a speaker 240 is coupled to the frame 230 and positioned adjacent the ear canal of the user (in some implementations, another speaker, not shown, is positioned adjacent the other ear canal of the user to provide for stereo/shapeable sound control). The display 220 can include an audio sensor (e.g., a microphone) for detecting an audio stream from the environment and/or capture ambient sound. In some implementations, one or more other audio sensors, not shown, are positioned to provide stereo sound reception. Stereo sound reception can be used to determine the location of a sound source. The wearable system 200 can perform voice or speech recognition on the audio stream.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and/or storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 270 and remote data repository 280 may be operatively coupled to each other.

In some implementations, the remote processing module 270 may comprise one or more processors configured to analyze and process data or image information. In some implementations, the remote data repository 280 may comprise a digital data storage facility, which may be available through the internet or other networking configuration in a "cloud" resource configuration. In some implementations, all data is stored and all computations (e.g., AR processes discussed herein) are performed in the local processing and data module, allowing fully autonomous use from a remote module. In other implementations, some or all of the computations of certain AR processes discussed herein are performed remotely, such as at a network-connected server.

Enhanced Depth Determination

As described above, generating an accurate representation of a real-world object may require a technique to accurately determine depth information for the real-world object. For example, a real-world object may represent an actor. A three-dimensional representation of the actor may be generated, for example so that the representation may be used in a virtual or augmented reality scene. As described above, an example technique to generate the representation may include using a multitude of stereo camera pairs. These stereo camera pairs may obtain respective pairs of stereo images. Based on these pairs of stereo images, depth information for the actor may be generated. However, due to incorrectly matching locations between pairs of stereo images and/or ambiguities within the images, the depth information may include inaccuracies. These inaccuracies may cause the representation of the actor to look unnatural in a virtual or augmented reality scene, such that a user experience is reduced.

In contrast, the techniques described herein may allow for a system (e.g., the depth determination system 400) to more accurately determine depth information for a real-world object. As will be described, for example with respect to FIG. 6, images of a real-world object may be obtained using an example layout of image sensors. The example layout may further include infrared radiation (IR) projectors which each output a multitude of projection spots onto the real-world object. The system may determine depth information for the real-world object based on assigning respective depths, or real-world locations, to the projection spots depicted on the real-world object. In this way, the system may generate an accurate representation of depth information for the real-world object.

To accurately assign depths to projection spots depicted in an image, a calibration process may be performed prior to a real-world object being imaged. As will be described, the calibration process may cause a calibration surface (e.g., a substantially planar board) to be positioned in front of a particular IR projector. Thus, the particular IR projector will cause light forming projection spots to be projected on the calibration surface. In some embodiments, the calibration surface may include markers at each of its corners (e.g., aruco or charuco markers). These markers may be usable to determine three-dimensional orientation information of the calibration surface. For example, a pose and shape of the calibration surface may be determined. One or more image sensors may obtain respective images of the calibration surface according to their position within an example layout. For example, these image sensors may be fixed within the example layout. The obtained images may therefore depict light from the particular IR projector which forms projection spots on the calibration surface. The calibration surface may then be moved away from the particular IR projector. As the calibration surface is moved, the image sensors may obtain subsequent images of the calibration surface.

The calibration surface, as an example, may be moved from a first position in front of the particular IR projector to a second, further, position in front of the particular IR projector. In some embodiments, the first position may be further from the IR projector and the second position may be closer to the IR projector. It may be appreciated that light from the particular IR projector, which forms at least a first projection spot, may be adjusted in position on the calibration surface. For example, an image of the calibration surface at the first position will depict the first projection spot at a certain two-dimensional location on the calibration surface. Additionally, the image will depict the first projection spot as a particular size. When the calibration surface is moved to the second position, a subsequent image will depict the first projection spot at a different two-dimensional location on the calibration surface. Additionally, the subsequent image will depict the first projection spot as a different size (e.g., a larger size when the second position if further away from the projector than the first position).

With respect to the above-described first projection spot, the system may therefore determine geometric information associated with light from the particular IR projector which forms the first projection spot in the images. For example, the light may be projected as a cone of light from the particular IR projector. The cone of light may intersect with the calibration surface in the above-described image and subsequent image, such that the image and subsequent image will depict the resulting first projection spot at their respective depths from the IR projector. Since the first projection spot is projected on the calibration surface, three-dimensional positions of the first projection spot as depicted in the images may be determined based on the orientations (e.g., pose) of the calibration surface in respective images. As described above, an orientation of the calibration surface may be determined using charuco markers. Additionally, the orientation may inform a shape associated with the first projection spot as depicted in an image. For example, the calibration surface's angle with respect to the cone of light may determine the shape of the observed spot (e.g., the first projection spot). Using these three-dimensional positions, geometrical information associated with a cone of light which forms the first projection spot may be determined. Example geometric information may include an origin associated with the cone of light optionally along with a direction of the cone of light. In some embodiments, the geometric information may represent a vector extending from a center of the cone of light.

Similar to the above, the system may determine geometric information for all, or a portion of, the projection spots depicted in images of the calibration surface as it is moved away from the particular IR projector. In some embodiments, only one IR projector may be used. In implementations in which additional IR projectors are used, the calibration surface may then be successively placed in front of the additional IR projectors. The calibration surface may then be moved away from each additional IR projector as described above. In some embodiments, one IR projector may be activated at one time during calibration. Thus, only the IR projector from which a calibration surface is moving away may be outputting light. In this way, cross-talk between the IR projectors may be reduced or eliminated. In some embodiments, all IR projectors may be activated during calibration.

The system may generate a mapping, or look-up table, which indicates geometric information associated with projection spots being projected via IR projectors. Example geometric information may include shape information, size information, position information, overlap information with other projection spots, and so on, for each projection spot at varying distances. As an example, shape and size information may be determined for a cone of light forming a projection spot. As this cone of light propagates further in distance from its origin (e.g. the IR projector), its shape and/or size may adjust, such that any intersection of the cone of light with a real-world object will form an associated projection spot with a particular shape and/or size. Since each image sensor will obtain images with a respective perspective or vantage point, the mapping, or look-up table, may include shape information, size information, position information, and so on, for each image sensor at varying distances. In some embodiments, using camera parameters for each image sensor, the system described herein may determine shape information, size information, position information, and so on, for any image sensor. Using this mapping, or look-up table, the system may assign depths, or real-world locations, to projection spots projected onto a real-world object within the mapped volume (e.g., a volume capture stage).

Optionally, the mapping, or look-up table, may indicate specific image pixels for an image sensor which, if a projection spot of a particular size and/or shape is reflected in the image pixel or pixels, represents a particular distance, depth, or real-world coordinates, for the projection spot and for the object intersecting the projection spot. Optionally, the mapping, or look-up table, may indicate specific image pixels and a corresponding pixel intensity function as corresponding to a projection spot at a particular distance, depth, or real-world coordinates. For example, the pixel intensity function may represent a Gaussian function centered at a central axis corresponding to a cone of light which forms the projection spot.

Figure 6:
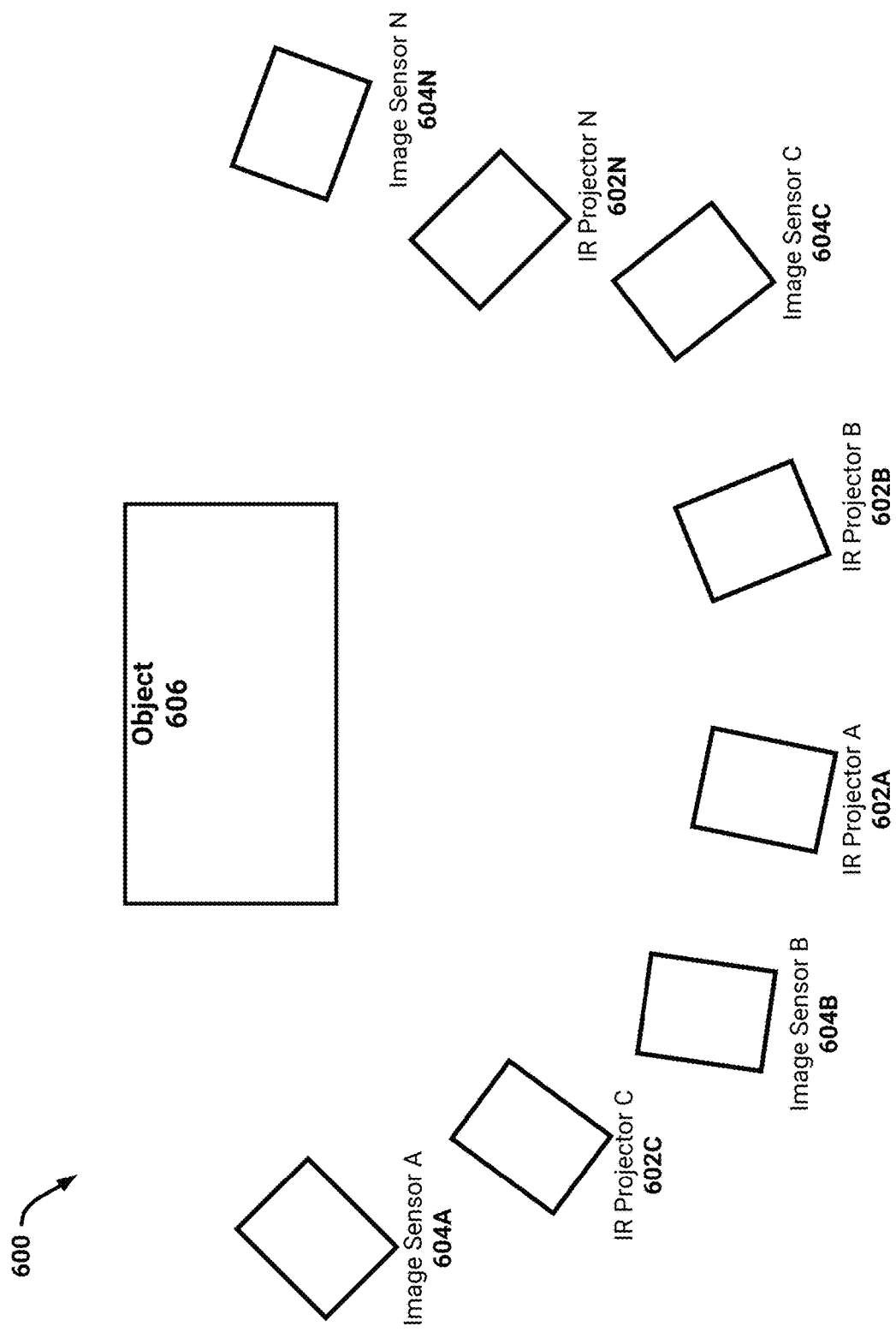
FIG. 6 illustrates a block diagram of an example layout of infrared radiation (IR) projectors and image sensors according to the techniques described herein.

For example, a real-world object may be placed in an example layout (e.g., illustrated in FIG. 6). An image of the real-world object may be obtained via a first image sensor. This image may additionally depict a multitude of projection spots from one or more IR projectors positioned in the example layout. The system may identify a first projection spot as depicted in the image. Based on the position and/or size of the first projection spot in the image, the system may assign a depth and/or real world location associated with the first projection spot. For example, the first projection spot may represent an intersection of an associated cone of light from a first IR projector with the real-world object. Based on the associated cone of light, a distance at which the cone of light must have traveled to cause the first projection spot to be depicted at the position and/or size within the image may be identified. This information may optionally be reflected in the projection spot map described herein. In this way, the system may access the projection spot map and identify, based on the position and/or size of the first projection spot, the corresponding depth and real world location in 3D space. In some embodiments, the system may access the projection spot map and identify, based on an identification of pixels depicting the first projection spot and/or pixel intensity values for the first projection spot, the corresponding depth. Example techniques to assign depths to projection spots are included below, with respect to FIGS. 7-8.

Figure 3A:
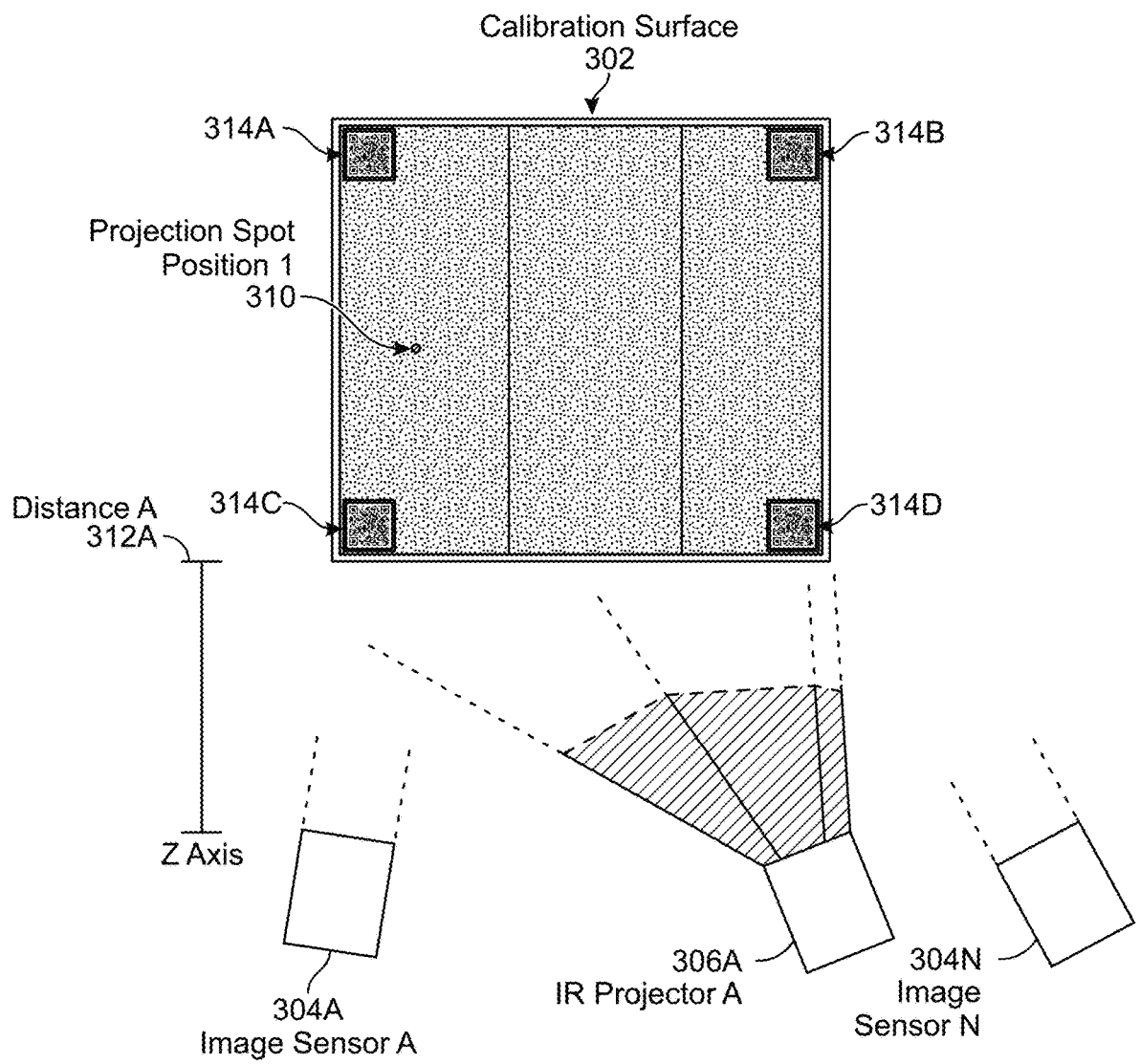
FIGS. 3A-3C illustrate a calibration surface with projection spots thereon being imaged according to the techniques described herein.
Figure 3B:
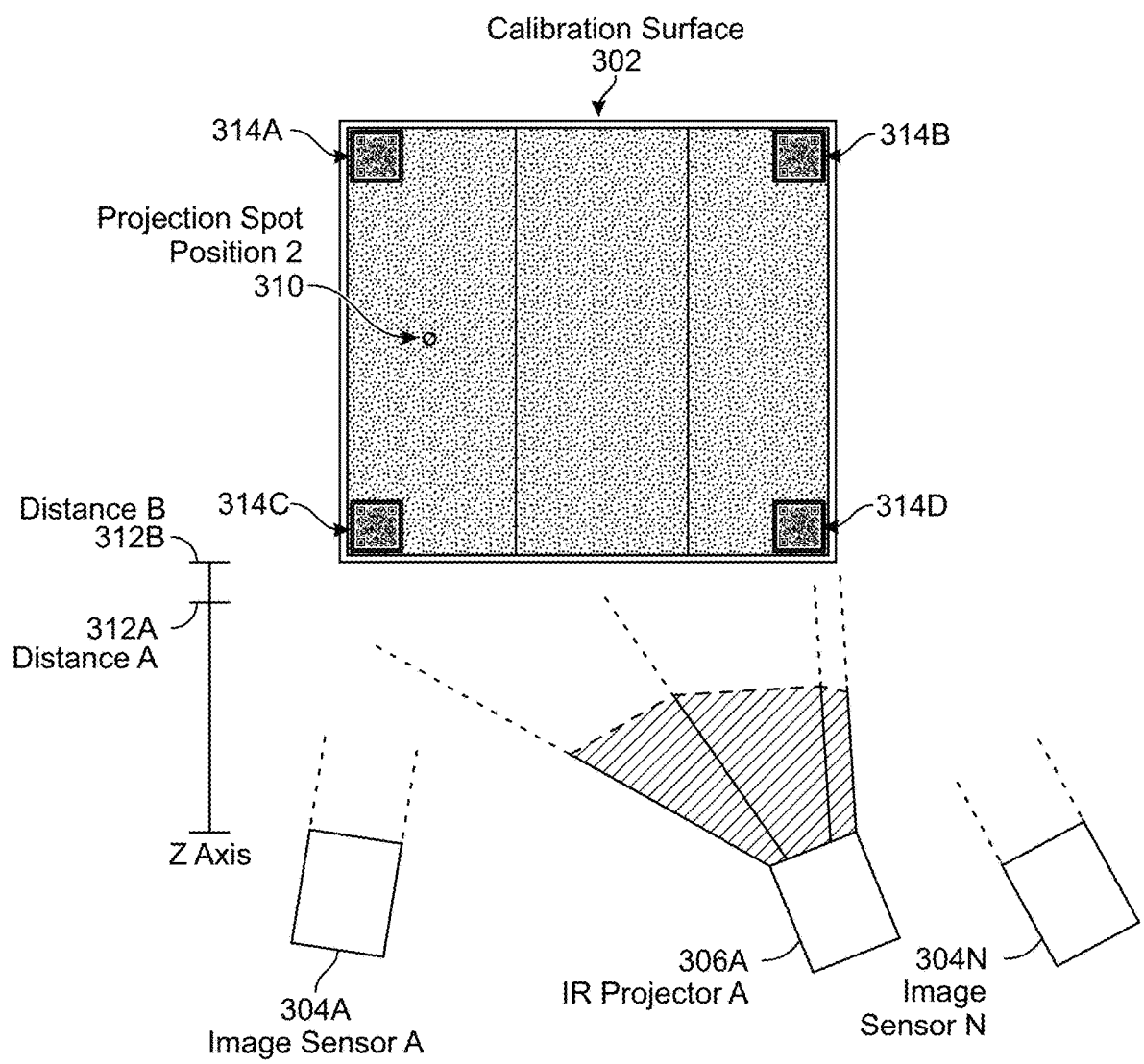
Figure 3C:
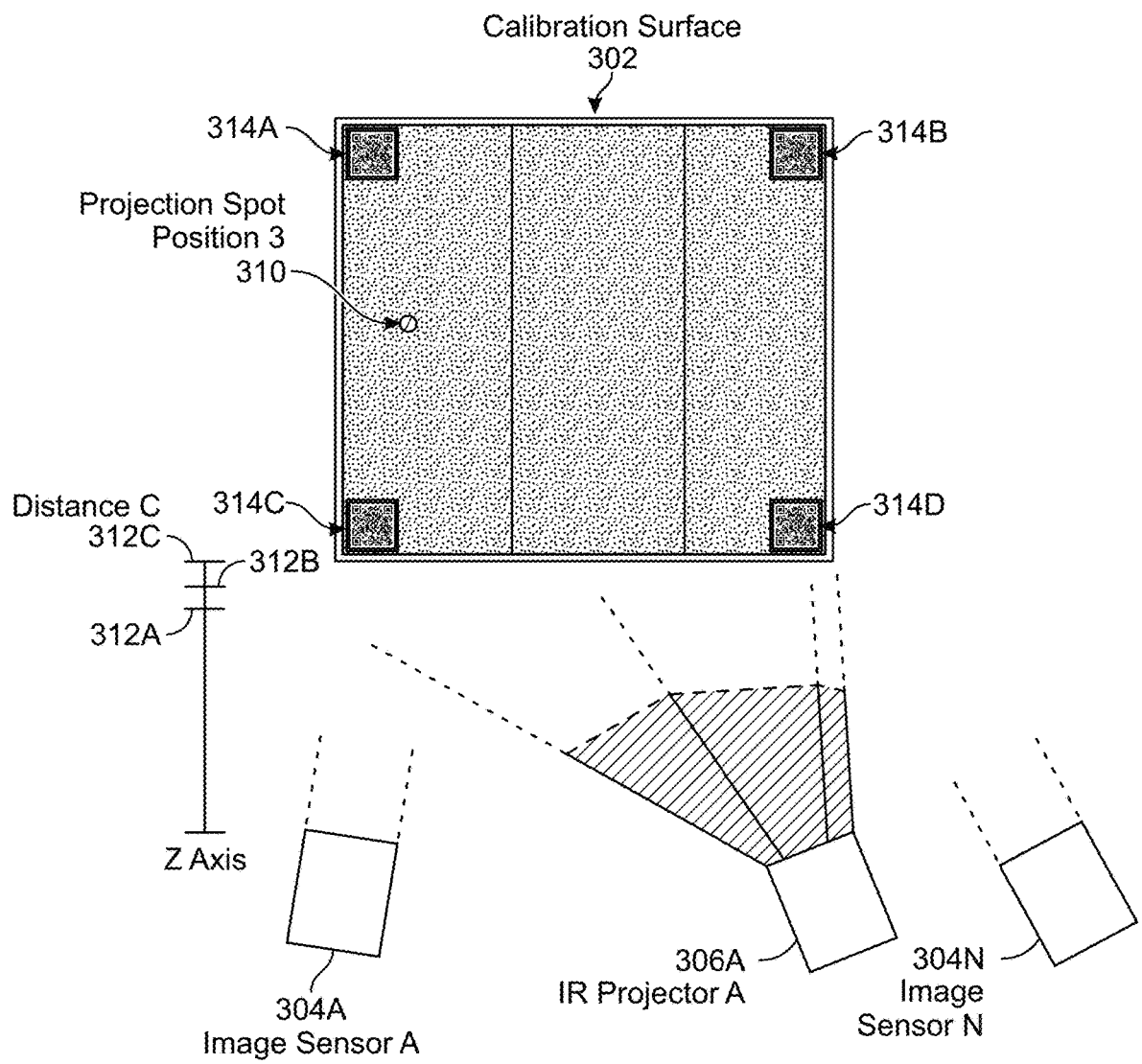

FIGS. 3A-3C illustrate a calibration surface 302 with projection spots thereon being imaged according to the techniques described herein. In the illustrated example of FIG. 3A, a multitude of image sensors A-N 304A-304N are included. These image sensors 304A-304N may be fixed in an example layout, such as the layout illustrated in FIG. 6. Additionally, an infrared radiation (IR) projector 306A is included in the example illustration. In some embodiments, there may be a multitude of IR projectors.

The calibration surface 302 is illustrated as being at a distance A 312A. The distance A 312A may represent a distance from an image sensor (e.g., image sensor A 304A). The distance A 312A may optionally represent a distance from IR projector A 306A. At the corners of the calibration surface are markers 314A-314D. These markers 314A-314D may, in some embodiments, be aruco markers. In some embodiments, the markers 314A-314D have to be used in order to determine an orientation of the calibration surface. For example, the orientation may include rotation information, distance information, and so on. In this example, the markers 314A-314D may be usable to translate a two-dimensional image of the calibration surface 302 into three-dimensional coordinates. Thus, in some embodiments the distance 312A may represent a distance as identified based on the markers 314A-314D. In some embodiments, more or fewer than 4 markers may be used.

The IR projector A 306A is illustrated as outputting a multitude of projection spots onto the calibration surface 302. An example projection spot 310 is illustrated as being at position 1 on the calibration surface 302. This example projection spot 310 may represent an intersection of a cone of light being output by the IR projector A 306A with the calibration surface 302. It may be appreciated that the position of the projection spot 310 may be based on an orientation of the calibration surface 302. For example, if the calibration surface 302 is rotated differently (e.g., at a different angle with respect to IR projector A 306A), then the projection spot 310 may be adjusted in position, size, and/or shape. Similarly, if the calibration surface 302 is at a different distance, then the projection spot 310 may be adjusted in position, size, and/or shape. Distance A 312A may optionally represent a distance associated with projection spot 310.

In some embodiments, a person may hold the calibration surface 302 in front of IR projector A 306A. The image sensors A-N 304A-N may obtain respective images of the calibration surface 302. The person may then move the calibration surface 302 away from IR projector A 306A. For example, the calibration surface 302 may be moved substantially along a vector extending orthogonally along a Z-direction from a center of the calibration surface 302. In some embodiments, the calibration surface 302 may be moved via a mechanical setup. For example, the calibration surface 302 may be connected to a device which sits on rollers. In this example, the device may be moved along the rollers causing movement of the calibration surface 302. Optionally, an unnamed robot may move the calibration surface 302. Thus, in some embodiments the techniques described herein may be performed in an automated fashion for any arbitrary layout of image sensors and IR projectors. In some embodiments, the movement of the calibration surface 302 may be done manually by a person.

As the calibration surface 302 is moved, the image sensors A-N 304A-304N may obtain successive images of the calibration surface 302. For example, the images may be obtained at a particular rate (e.g., 30 frames per second, 60 frames per second, and so on). In this way, movement of the projection spot 310 may be monitored. As will be described below, the markers 314A-314D may enable an identification of a three-dimensional position of the projection spot 310 in each of the images.

FIG. 3B illustrates the calibration surface 302 being moved to a distance B 312B. In some embodiments, the calibration surface 302 may be continuously moved. In these embodiments, the image sensors A-N 304A-304N may obtain images at the particular rate described above. In some embodiments, the calibration surface 302 may be moved in discrete steps. For example, the calibration surface 302 may be positioned as illustrated in FIG. 3A. In this example, the image sensors A-N 304A-304N may be triggered to obtain images. The calibration surface 302 may then be positioned as illustrated in FIG. 3B. The image sensors A-N 304A-304N may be similarly triggered to obtain subsequent images.

As illustrated, the projection spot 310 has moved to position 2 as compared to position 1 illustrated in FIG. 3A. For example, a two-dimensional location of the projection spot 310 may be adjusted based on the movement of the calibration surface 302. As an example, the projection spot 310 may be moved towards an upper left of the calibration surface 302. Additionally, a size of the projection spot 310 may be increased. For example, a cone of light from the IR projector A 306 may form the projection spot 310. As the calibration surface 302 is moved further from the IR projector A 306, the cone of light may correspondingly extend outward. Thus, a size of the resulting projection spot 310 on the calibration surface 302 may be increased.

In some embodiments, a system (e.g., the depth determination system 400) may monitor movement of the projection spot 310. For example, as the calibration surface 302 is moved, the image sensors A-N 304A-304N may obtain images at the particular rate described above. If this speed is greater than a threshold, the system may monitor precise movements of each projection spot between images.

In some embodiments, the projection spots output by the IR projector A 306A may conform to a particular pattern. For example, the IR projector A 306A may output a repeating pattern of projection spots. Thus, a particular projection spot may be locally distinct from its neighbors. As an example, a position of projection spot 310 may be unique, or otherwise identifiable, as compared to projection spots within a threshold distance of projection spot 310. The system may therefore identify projection spot 310 as included in different images based on its location within a particular pattern. In this way, for discrete movements of the calibration surface 302, the system may identify same projection spots between images. For example, the system may identify a difference in distance between distance A 312A and distance B 312B. This distance may inform an extent to which projection spot 310 can move on the calibration surface 302. Thus, the system may identify projection spot 310 in images at distance B 312B based on its position within a pattern identified in images at distance A 312A. For example, the position may be substantially unique as compared to other projection spots within a threshold distance.

FIG. 3C illustrates the calibration surface 302 being moved to a distance C 312C. Similar to the above description, the calibration surface 302 may be moved to a new position corresponding to distance C 312C. As illustrated, the projection spot 310 may thus be adjusted in position on the calibration surface 302. Images of the calibration surface 302 may be obtained by image sensors A-N 304A-304N at distance C 312C.

As will be described below, a system may obtain images from image sensors A-N 304A-304N during movement of the calibration surface. Based on the images, the system may determine geometric information associated with each projection spot. For example, an origin and/or direction of each cone of light from IR projector A 306A may be identified. In this way, the system may identify how each cone of light is projected throughout space from IR projector A 306. Thus, the system may identify, for any arbitrary position from IR projector A 306A, a position and/or size of a projection spot formed based on an intersection, an associated cone of light with an object.

Figure 4:
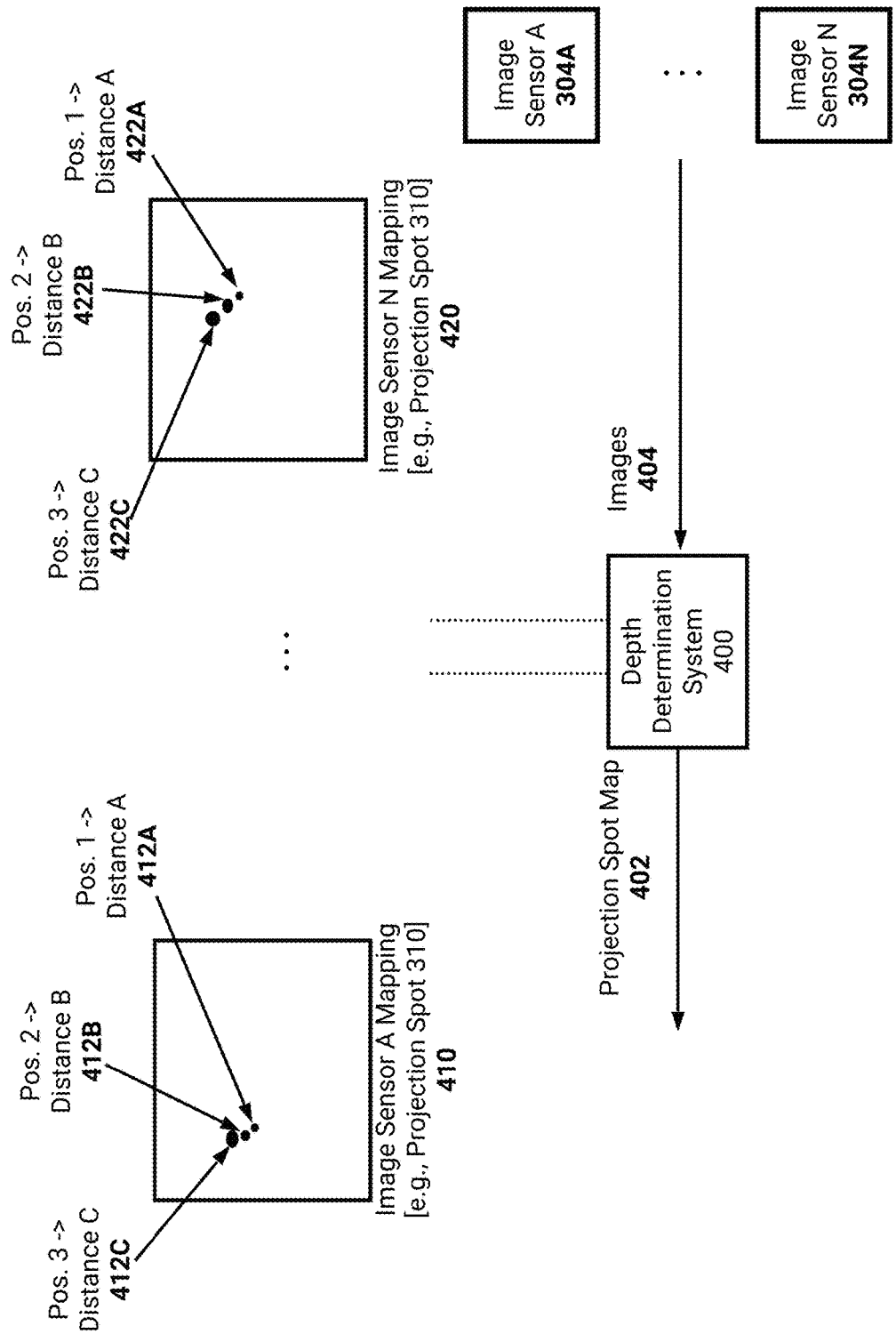
FIG. 4 illustrates a block diagram of an example depth determination system determining a projection spot map.

FIG. 4 illustrates a block diagram of an example depth determination system 400 determining a projection spot map 402. The depth determination system 400 may represent a system of one or more computers, one or more virtual machines executing on a system of one or more computers, and so on. As illustrated, the depth determination system 400 may receive images 404 and generate a projection spot map 402. The images 404 may represent images obtained during movement of a calibration surface, such as described in FIGS. 3A-3C above.

In the illustrated example, the images 404 depict movement of a particular projection spot (e.g., projection spot 310). For example, a mapping 410 of positions of the projection spot 310 as included in images obtained by image sensor A 304A is depicted. As another example, a mapping 420 of positions of the projection spot 310 as included in images obtained by image sensor N 304N is depicted. With respect to mapping 410, positions of the projection spot 310 are illustrated at distance A 412A, distance B 412B, and distance C 412C. These positions may correspond with positions on image sensor A 304A, such as two-dimensional positions within images obtained by image sensor A 304A. Similarly, and with respect to mapping 420, positions of the projection spot are illustrated at distance A 422A, distance B 422B, and distance C 422C.

The projection spot 310 is illustrated as being adjusted in two-dimensional position for each of the mappings 410, 420. Additionally, the projection spot 310 is illustrated as being adjusted in size. As described in FIGS. 3A-3C, as the calibration surface 302 is moved away from IR projector A 306A, the projection spot 310 will be adjusted accordingly. This adjustment of the projection spot 310 may thus depend on movement of the calibration surface 302. Additionally, the adjustment of the projection spot 310 may depend on an orientation of the calibration surface 302. For example, the projection spot 310 may be rotated slightly at distance B 412B as compared to distance A 412A. The depth determination system 400 may therefore use markers 314A-314D to determine orientations of the calibration surface 302 in each of the images 404. In some embodiments, the mappings 410, 420, illustrated in FIG. 4 may be adjusted to correspond with a same orientation of the calibration surface 302.

Thus, based on the markers 314A-314D, the depth determination system 400 may identify a three-dimensional position of the calibration surface 302 at distances A-C 412A-412C. For example, the system 400 may use parameters of the image sensors 304A-304N to determine the three-dimensional position of the calibration surface 302 in each of the images 404. Similarly, the depth determination system 400 may determine corresponding three-dimensional positions of projection spot 310 as depicted at distances A-C 412A-412C. As an example, the calibration surface 302 may be planar. Thus, any point on the calibration surface 302 may be translatable into three-dimensional coordinates using the markers 314A-314D. Since the projection spot 310 is projected onto the calibration surface 302 in each image, the system 400 can similarly translate its two-dimensional location in the image onto a three-dimensional location.

In this way, mapping 410 may indicate three-dimensional locations of projection spot 310 at distances A-C 412A-412C. Similarly, mapping 420 may indicate three-dimensional locations of projection spot 310 at distances A-C 412A-412C. The depth determination system 400 can then determine geometric information associated with a cone of light which may form projection spot 310 at the distances A-C 412A-412C. For example, the depth determination system 400 can determine a line extending through a center of each three-dimensional location of projection spot 310 in mapping 410. As another example, the depth determination system 400 can determine a line extending through a center of each three-dimensional location of projection spot 310 in mapping 420. Based on these lines, the depth determination system 400 may determine an origin associated with a cone of light capable of forming projection spot 310 as depicted in the images 404.

Therefore, the depth determination system 400 may generate a projection spot map 402 based on geometric information associated with each cone of light projected by an IR projector (e.g., IR projector A 306A). The projection spot map 402 may include geometric information associated with each cone of light projected by an IR projector. For example, the depth determination system 400 may perform the steps described above for projection spots other than projection spot 310 as included in the images 404. As will be described below, with respect to FIG. 6, there may be a multitude IR projectors (e.g., 6, 8, 10) located at different positions in an example layout. Thus, the projection spot map 402 may reflect geometric information associated with any cone of light projected by the multitude of IR projectors.

As will be described below, with respect to at least FIGS. 7-8, the projection spot map 402 may be usable to assign a distance to each projection spot depicted in an image obtained from any image sensor. For example, and as described above, the projection spot map 402 may include information indicative of geometric information associated with cones of light provided from IR projectors. This information may be usable to identify a location, such as a depth, associated with a projection spot. As an example, the system may identify, for a projection spot included in an image, the associated cone of light which formed the projection spot in the image based on the projection spot map 402. The system may then identify a distance which the cone of light extended to cause the associated projection spot in the image. For example, the system may traverse through distances from the IR projector projecting the cone of light. In this example, the system may identify a distance at which the cone of light forms the projection spot according to a size and/or position of the projection spot as depicted in the image. This distance may be assigned as the distance for the projection spot. Optionally, this distance may be translated into real-world coordinates (e.g., based on camera parameters).

In some embodiments, the projection spot map 402 may be usable to translate between image pixels of an image which depict a projection spot and an associated cone of light which forms the projection spot depicted in the image. For example, an image may include a threshold number of image pixels which depict a projection spot. The image pixels may depict the projection spot optionally as a Gaussian. As an example, the image pixels may depict the projection spot as having a greatest intensity at a center of the image pixels with the intensity falling off according to the Gaussian. Thus, the image may depict the projection spot with a certain size (e.g., based on the pixels) and position within the image. The projection spot map 402 may indicate that, for an image sensor associated with the image, the image pixels correspond with a cone of light from a particular IR projector. Based on this cone of light, a distance associated with the projection spot may be identified. In some embodiments, the projection spot map 4023 may indicate that, for an image sensor associated with the image, the image pixels correspond with a certain distance.

Figure 5:
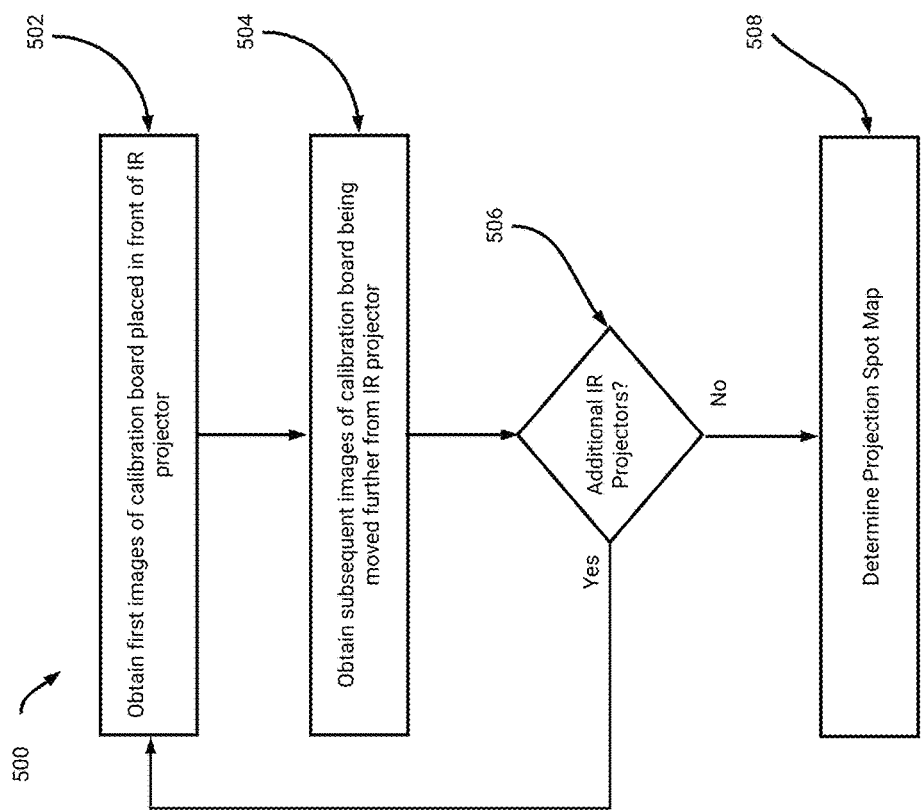
FIG. 5 illustrates a flowchart of an example process to determine a projection spot map.

FIG. 5 illustrates a flowchart of an example process 500 to determine a projection spot map. For convenience, the process 500 will be described as being performed by a system of one or more computers (e.g., the depth determination system 400).

At block 502, the system obtains first images of a calibration board placed in front of an IR projector. As described in FIG. 3A, a calibration board may be placed within a threshold distance of an IR projector. For example, the threshold distance may be selected such that the IR projector does not block a view of the calibration board by one or more imaging sensors. The first images may be obtained from the one or more imaging sensors, which may be positioned at different locations proximate to the IR projector. These different imaging sensors may therefore have a respective view, or vantage point, with respect to the calibration board at a given point in time.

The IR projector may project a multitude of projection spots, for example according to a particular pattern or repeating pattern. In some embodiments, the IR projector may use one or more IR lasers and one or more diffraction gratings to cause projection of the projection spots. For example, a diode may output IR light. A diffraction grating may then cause the output IR light to be diffracted into a particular pattern or repeating pattern. Each projection spot included in the pattern or repeating pattern may thus be associated with an origin at the IR projector. For example, each projection spot may extend from a respective origin informed by the diffraction grating.

In this way, each projection spot may represent a cone of light which is projected by the IR projector. The cone of light may, as an example, be defined as a vector extending from a particular origin. The projection spots depicted in the first images may therefore represent intersections of associated cones of light with the calibration surface. Since each of the first images may be from a different image sensor, the projection spots may be imaged according to differing views, or vantage points, provided by the differing image sensors at a given point in time.

At block 504, the system obtains subsequent images of the calibration board being moved further from the IR projector. As described in FIGS. 3A-3C, the system may continually obtain images as the calibration board is moved further from the IR projector. Optionally, the system may obtain images based on discrete movements of the calibration board. For example, the calibration board may be moved a certain distance and the image sensors may be triggered. The projection spots projected onto the calibration board may adjust in position and size as the calibration board is moved since the calibration board intersects the cone of light at a different location. The obtained images, as described above, may therefore depict these adjustments.

At block 506, the system may obtain images of the calibration board placed in front of an additional IR projector. Blocks 502-504 may be repeated until no additional IR projectors remain.

At block 508, the system determines a projection spot map. For example, and as described above with respect to FIGS. 3A-4, images associated with each image sensor may be analyzed. The images associated with a same image sensor may depict projection spots at different two-dimensional locations within the images. The system may determine three-dimensional locations of these projection spots. For example, and as illustrated in FIGS. 3A-3C, the calibration surface may include a threshold number of markers (e.g., 4, 6, and so on) usable to determine an orientation of the calibration surface. Using these markers, the system may determine three-dimensional locations of projection spots depicted in the images. In this way, the system may determine geometric information associated with a cone of light forming each projection spot.

As may be appreciated, as the calibration board is moved away from the IR projector, a same cone of light may intersect the calibration board at different positions. These different positions may be reflected in the images as projection spots. The system may therefore associate these projection spots with a same cone of light. Example geometric information may include an origin and direction of the cone of light.

The projection spot map may indicate, for each image sensor, information usable to identify respective real-world locations of projection spots depicted in an image obtained by the image sensor. In some embodiments, the projection spot map may represent a data structure (e.g., a matrix) which associates projection spots at varying distances with image pixels of each image sensor. For example, at a particular distance an image sensor may image a projection spot on the calibration board using one or more first pixels. As another example, at a different distance the image sensor may image the projection spot on the calibration using one or more second pixels. The projection map may therefore store information associating each projection spot at various distances with image pixels of each image.

As will be described, a multitude of images may be obtained of a real-world object. For example, a multitude of image sensors may be positioned about the real-world object. The projection spot map may enable assignment of depths to projection spots depicted in each of the images. For example, a projection spot may be identified in a first image. Pixels which form this projection spot may thus be identified. Based on the projection spot map, information indicative of a distance at which a cone of light forming the projection spot may be identified.

The above-described distance may thus be used to assign a particular depth to the projection spot. In some embodiments, a shape associated with the projection spot may be analyzed. The shape may inform angle information associated with a surface of the real-world object at the projection spot. For example, if the projection spot is an ellipse then the surface may be identified as angled along one or more axes (e.g., the z-axis).

Example Layout

FIG. 6 illustrates a block diagram of an example layout 600 of infrared radiation (IR) projectors 602A-602N and image sensors 604A-604N according to the techniques described herein. The example layout 600 includes a portion on which a real-world object 606 may be placed. The real-world object 606 may represent an object for which a three-dimensional representation is to be generated. In some embodiments, the example layout 600 may be a volume capture system and the portion on which a real world object 606 may be placed may be a volume capture stage.

As illustrated, IR projectors 602A-602N are positioned from a left to a right of the real-world object 606. Similarly, image sensors 604A-604N are positioned from a left to a right of the real-world object 606. In some embodiments, the image sensors and IR projectors may fully or partially surround the real-world object 606. The IR projectors 602A-602N may project projection spots onto the real-world object. The image sensors 604A-604N may obtain images of the real-world object 606 with the projection spots thereon. According to the techniques described herein, a system may determine depth information for the real-world object 606 based on the projection spots. For example, each projection spot may indicate a precise depth of the real-world object 606. Optionally, each projection spot may indicate an angle or orientation associated with a surface of the real-world object on which the projection spot is positioned.

The system may therefore generate a precise three-dimensional representation of a surface of the real-world object 606. Using the obtained images, the system may generate texture information for the representation of the surface. In some embodiments, the real-world object 606 may be a person.

In some embodiments, image sensors and IR projectors may be positioned fully around the real-world object 606. In some embodiments, the real-world object 606 may be rotated such that the images of the entirety of the real-world object 606 may be obtained. While the illustrated of FIG. 6 depicts the image sensors and IR projectors in a particular layout, it should be appreciated that any layout may be employed and fall within the scope of the disclosure.

In some embodiments, locations of the image sensors 604A-604N and IR projectors 602A-602N may be known relative to a shared coordinate frame. These locations may be used to inform absolute locations, such as absolute distances, associated with projection spots depicted in images of the real-world object 606.

Determining Depth Information of Real-World Objects

Figure 7:
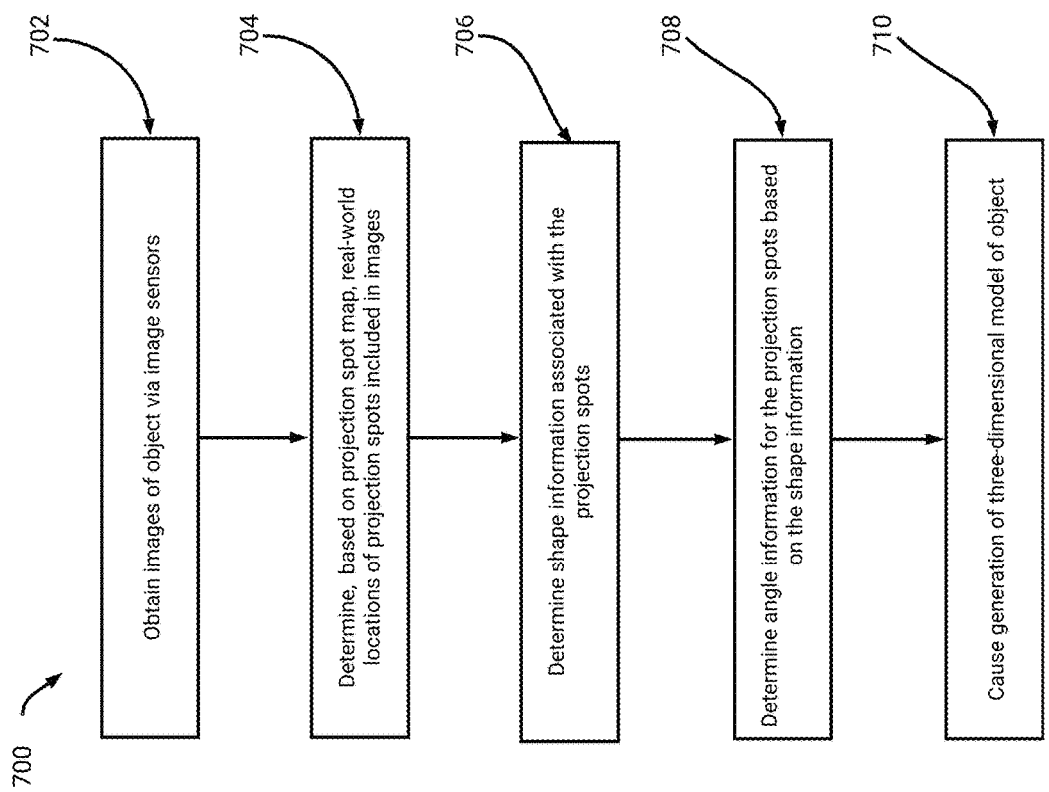
FIG. 7 illustrates a flowchart of an example process for generating a three-dimensional representation of a real-world object.

FIG. 7 illustrates a flowchart of an example process 700 for generating a three-dimensional representation of a real-world object. For convenience, the process 700 will be described as being performed by a system of one or more computers. For example, the process 700 may be performed by the depth determination system 400 described in FIG. 4. The process 700 may also be performed by a system of one or more processors (e.g., a computer, laptop, tablet, mobile device, wearable device, augmented or virtual reality device or display system, and so on).

At block 702, the system obtains images of a real-world object. The images may be obtained using a multitude of image sensors, such as cameras. An example layout illustrating a position of the real-world object with respect to the image sensors is included in FIG. 6. One or more IR projectors may output light forming projection spots onto the real-world object. Accordingly, the obtained images may depict projection spots representing intersections of the output light with the real-world object.

At block 704, the system determines real-world locations of projection spots in the images. As described above, with respect to FIGS. 3A-5, a projection spot map may indicate information usable to associate real-world locations with projection spots depicted in images. The system may therefore determine real-world locations of each, or a portion of the, projection spots depicted in the images.

For example, the system may identify a particular projection spot as being depicted in one or more pixels of an image. Based on the pixels, a size of the particular projection spot may be identified. The system may then use the projection spot map to determine a real-world location of the particular projection spot. As an example, the system may identify that the particular projection spot was formed from a cone of light extending from a particular IR projector. Based on this identification, the system may determine a distance associated with the cone of light.

The above-described distance may thus be used to inform a real-world location of the particular projection spot. For example, the image sensors may be calibrated such that camera parameters of the image sensors are known to the system. The system can therefore determine a three-dimensional real-world location at which the above-described cone of light must have intersected with the real-world object to cause the above-described image to depict the particular projection spot accordingly.

At block 706, the system determines shape information associated with the projection spots. As described above, the projection spots may be formed from cones of light being output by the IR projectors. Thus, a shape associated with the projection spots may inform angle or orientation information associated with each projection spot. For example, if a cone of light intersects with a planar surface orthogonal to the cone of light, the resulting projection spot may be in a particular shape (e.g., a circle). As another example, if the cone of light intersects with a planar surface at a different orientation, then the resulting projection spot may be in a different shape (e.g., an ellipse).

At block 708, the system determines angle information for the projection spots based on the shape information. The system may store information usable to determine angle information, such as an orientation, of a surface on which a projection spot is projected. For example, the system may model an adjustment to a shape of a projection spot based on its projection onto varying orientations of surfaces. In some embodiments, the system may use machine learning techniques to determine angle information. As an example, the machine learning techniques may analyze the shape information, and output a label or value indicative of an angle of a surface. Example machine learning techniques may include support vector machines, fully-connected deep learning networks, and so on).

At block 710, the system causes generation of a three-dimensional representation of the real-world object. Based on the real-world locations of the projection spots, the system may determine information identifying a surface of the real-world object. For example, the system may determine a point cloud corresponding to depths assigned to each of the projection spots. As another example, the system may determine a mesh formed from polygons which conform to the depths and angle information determined herein. In this example, the polygons may be based on depth and orientation information for surfaces of the real-world object on which the projection spots are imaged. The system, or an outside system, may use this information to inform generation of the three-dimensional representation.

Figure 8:
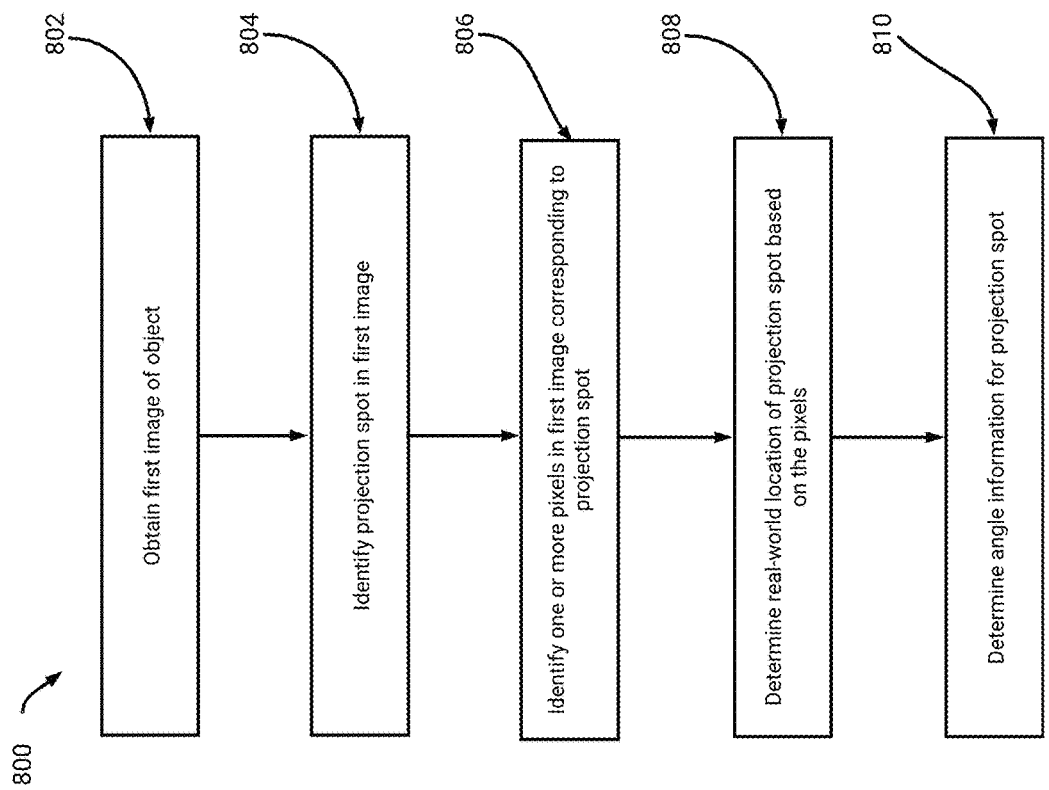
FIG. 8 illustrates a flowchart of an example process for determining information associated with a projection spot included in a first image of a real-world object.

FIG. 8 illustrates a flowchart of an example process 800 for determining information associated with a projection spot included in a first image of a real-world object. For convenience, the process 800 will be described as being performed by a system of one or more computers. For example, the process 800 may be performed by the depth determination system 400 described in FIG. 4. The process 800 may also be performed by a system of one or more processors (e.g., a computer, laptop, tablet, mobile device, wearable device, augmented or virtual reality device or display system, and so on).

Figure 9:
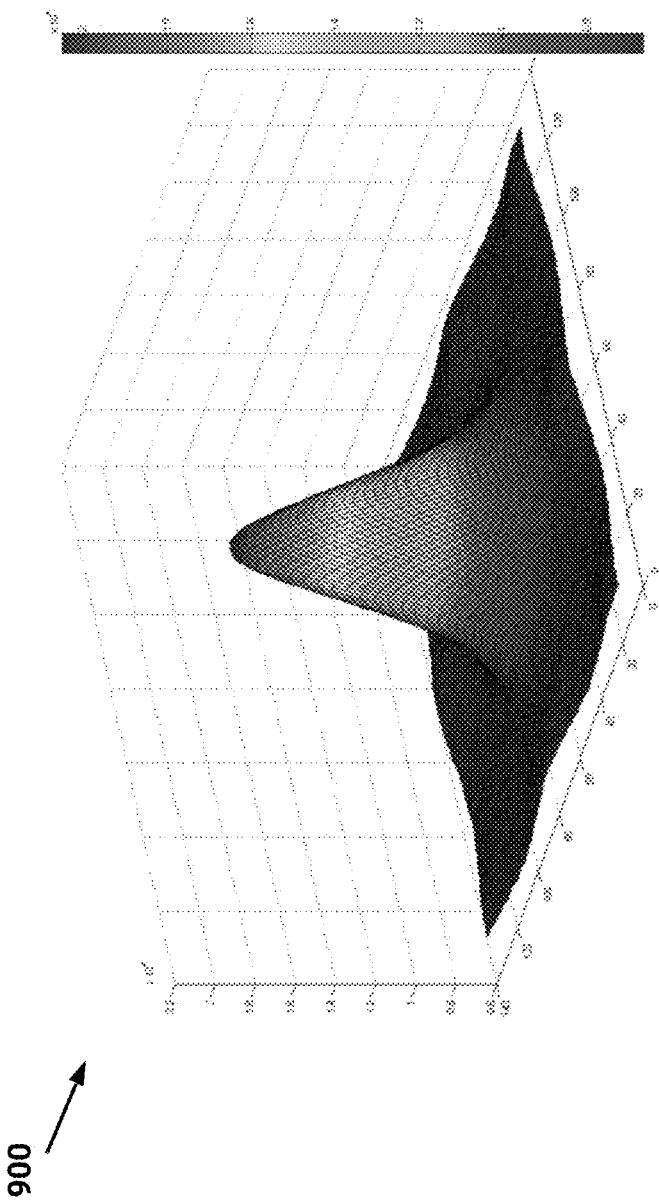
FIG. 9 illustrates an example a Gaussian intensity falloff.

At block 802, the system obtains a first image of a real-world object. At block 804, the system identifies a projection spot in the first image. At block 806, the system identifies one or more pixels of the first image which correspond to the projection spot. In some embodiments, the pixels may illustrate a Gaussian intensity falloff. For example, a peak intensity may represent an axis (e.g., a central axis) of a cone of light which formed the projection spot. An example of a Gaussian 900 is included in FIG. 9.

At block 808, the system determines a real-world location of the projection spot based on the pixels. For example, the system may access a projection spot map. As described above, the projection spot map may indicate that the projection spot may correspond to a certain real-world location based on the pixels depicting the projection spot. As an example, the pixels of the first image may only be able to illustrate the particular Gaussian intensity falloff based on the projection spot being at a certain three-dimensional location. The real-world location may represent a depth, such as a distance relative to a common point. In some embodiments, the real-world location may represent an x, y, and z value relative to a common coordinate system.

At block 810, the system determines angle information for the projection spot. With respect to the Gaussian 900 described above, a shape of the projection spot may be determined. For example, the Gaussian 900 may inform whether the pixels depict the projection spot as a particular shape (e.g., a circle or an ellipse). As described above, the shape may inform an orientation (e.g., a pose) of a surface of the real-world object on which the projection spot is projected.

Figure 10:
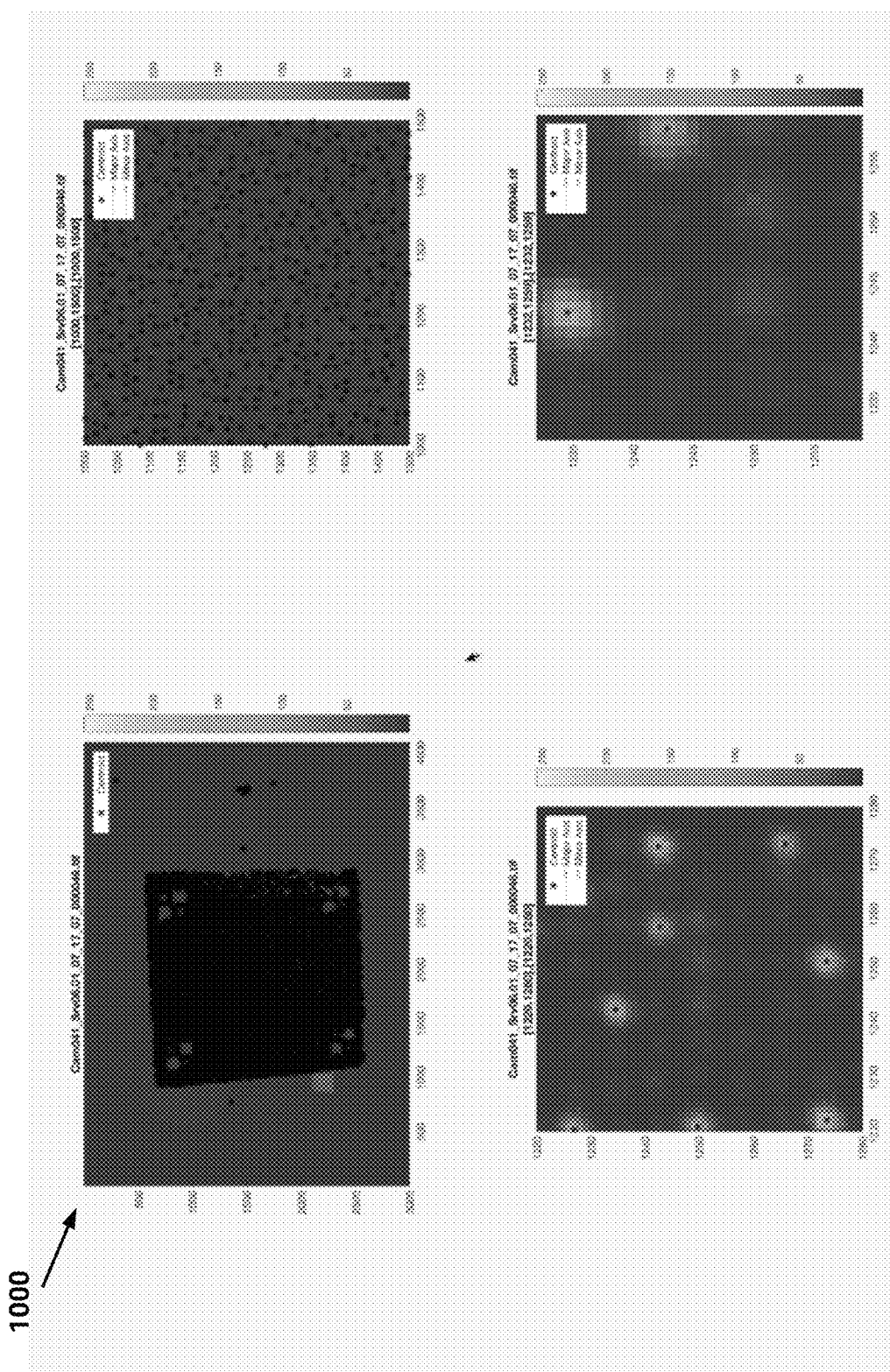
FIG. 10 illustrates an example of projection spots on a calibration board.

FIG. 10 illustrates an example 1000 of projection spots on a calibration board. For example, the projection spots may be circles and/or ellipses. Each projection spot on a calibration board may be detected and tracked over time. This may be used for parametric reconstruction of cones of light that are projected from the IR projectors as described herein.

Figure 11:
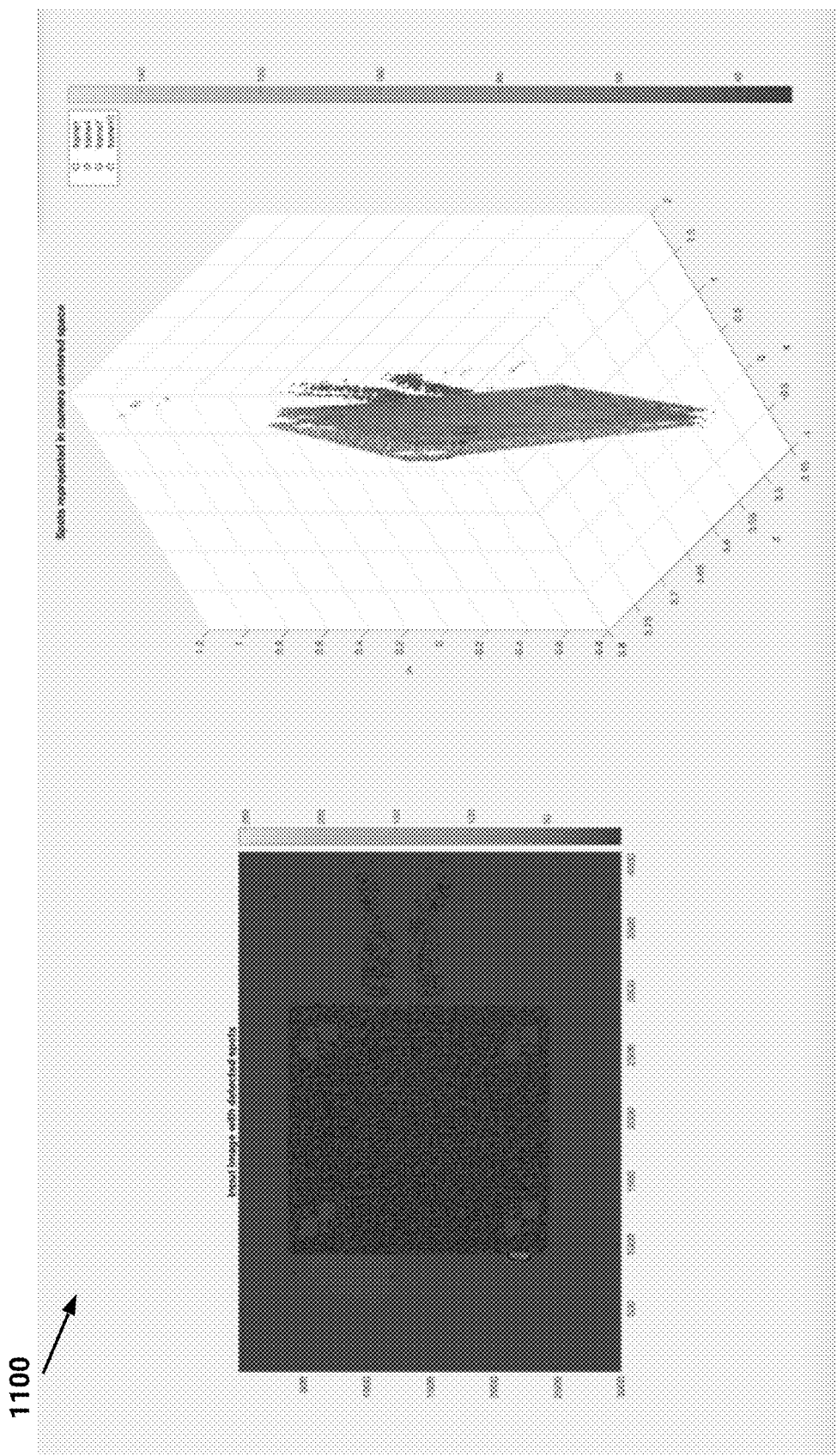
FIG. 11 illustrates an example of calibrating an image sensor with respect to a calibration board.

FIG. 11 illustrates an example 1100 of calibrating an image sensor with respect to a calibration board. This calibration may allow a system to re-project all tracked projection spots in three-dimensions with respect to an image sensor. Through at least some of the re-projected projection spots, a system may fit a cone axis of a cone of light. The system may then project each cone of light into a camera space (e.g., based on parameters of the image sensor) to identify which pixel(s) corresponds to which cone of light and an intensity which can be expected from it.

Other Embodiments

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the virtual content disclosed herein may also be displayed by systems that provide images on a single depth plane.

In addition, many modifications may be made to adapt a particular situation, material, composition of matter, process, process act, or step(s) to the objective(s), spirit, or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

In addition, it will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation. Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims.

Accordingly, the claims are not intended to be limited to the embodiments shown herein, but are to be accorded the widest scope consistent with this disclosure, the principles and the novel features disclosed herein.

What is claimed is:

1. A method implemented by a system of one or more computers, the method comprising:
    obtaining a plurality of images of a real-world object, the images being obtained from a plurality of image sensors positioned about the real-world object, and the images depicting projection spots projected onto the real-world object via a plurality of projectors positioned about the real-world object, each projection spot representing an intersection of a cone of light projected by one of the projectors with the real-world object;
    accessing a projection spot map, the projection spot map being based on geometric information associated with each cone of light and including information usable to determine real-world locations of projection spots based on depictions of the projection spots in the obtained images;
    assigning location information to the projection spots based on the projection spot map; and
    causing generation of a three-dimensional representation of the real-world object.

2. The method of claim 1, wherein the projection spot map includes information indicative of real-world locations of projection spots based on depictions of the projection spots in the obtained images, and wherein a depiction of a first projection spot comprises shape information, position information, and/or angle information, associated with image pixels which form the first projection spot.

3. The method of claim 1, wherein assigning location information to a first projection spot depicted in a first image comprises:
    identifying first pixels of the first image which depict the first projection spot; and
    identifying, based on the projection spot map and size, information indicative of a distance traveled by a cone of light associated with the first projection spot, and wherein the assigned location information is based on the indicated distance.

4. The method of claim 1, wherein assigning a location to a first projection spot depicted in a first image obtained from a first image sensor comprises:
    identifying one or more pixels in the first image which form the first projection spot; and
    identifying, for the first image sensor and the identified pixels, location information for the first projection spot based on the projection spot map.

5. A method implemented by a system of one or more computers, the method comprising:
  obtaining a plurality of images of a real-world object, the images being obtained from a plurality of image sensors positioned about the real-world object, and the images depicting projection spots projected onto the real-world object via a plurality of projectors positioned about the real-world object, each projection spot representing an intersection of a respective cone of light projected by a respective one of the projectors with a respective portion of a surface of the real-world object;
  accessing a projection spot map, the projection spot map including information usable to determine real-world locations of projection spots based on depictions of the projection spots in the obtained images;
  assigning location information to the projection spots based on the projection spot map, wherein the assigned location information represents, at least, respective depth information for each respective portion of the surface on which the respective cone of light is projected;
  identifying an orientation associated with each portion of the surface on which the respective cone of light is projected, wherein identifying an orientation associated with a first portion on which a first cone of light is projected comprises:
    identifying a shape associated with a first projection spot associated with the first cone of light, the first projection spot being depicted in one or more pixels of an image; and
    identifying, based on the shape, the orientation of the first portion; and
  causing generation of a three-dimensional representation of the real-world object.

6. A system comprising one or more processors and non-transitory computer storage media storing instructions that, when executed by the one or more processors, cause the processors to perform operations comprising:
  obtaining a plurality of images of a real-world object, the images being obtained from a plurality of image sensors positioned about the real-world object, and the images depicting projection spots projected onto the real-world object via a plurality of projectors positioned about the real-world object, each projection spot representing an intersection of a cone of light from one of the projectors with the real-world object;
  accessing a projection spot map, the projection spot map being based on geometric information associated with each cone of light and including information usable to determine real-world locations of projection spots based on depictions of the projection spots in the obtained images;
  assigning location information to the projection spots based on the projection spot map; and
  causing generation of a three-dimensional representation of the real-world object.

7. The system of claim 6, wherein the projection spot map includes information indicative of real-world locations of projection spots based on depictions of the projection spots in the obtained images, and wherein a depiction of a first projection spot comprises shape information, position information, and/or angle information, associated with image pixels which form the first projection spot.

8. The system of claim 6, wherein assigning location information to a first projection spot depicted in a first image comprises:
  identifying first pixels of the first image which depict the first projection spot; and
  identifying, based on the projection spot map and size, information indicative of a distance traveled by a cone of light associated with the first projection spot, and wherein the assigned location information is based on the indicated distance.

9. A system comprising one or more processors and non-transitory computer storage media storing instructions that, when executed by the one or more processors, cause the processors to perform operations comprising:
  obtaining a plurality of images of a real-world object, the images being obtained from a plurality of image sensors positioned about the real-world object, and the images depicting projection spots projected onto the real-world object via a plurality of projectors positioned about the real-world object, each projection spot representing an intersection of a respective cone of light projected by a respective one of the projectors with a portion of a surface of the real-world object;
  accessing a projection spot map, the projection spot map including information usable to determine real-world locations of projection spots based on depictions of the projection spots in the obtained images;
  assigning location information to the projection spots based on the projection spot map, wherein the assigned location information represents, at least, respective depth information for each respective portion of the surface on which the respective cone of light is projected;
  identifying an orientation associated with each portion of the surface on which the respective cone of light is projected, wherein identifying an orientation associated with a first portion on which a first cone of light is projected comprises:
    identifying a shape associated with a first projection spot associated with the first cone of light, the first projection spot being depicted in one or more pixels of an image; and
    identifying, based on the shape, the orientation of the first portion; and
  causing generation of a three-dimensional representation of the real-world object.

10. A method implemented by a system of one or more computers, the method comprising:
  obtaining, via a plurality of image sensors, images of a calibration board, the calibration board being positioned at a plurality of distances relative to one of a plurality of projectors outputting a plurality of projection spots, the projection spots including a first projection spot;
  identifying respective three-dimensional positions associated with each depiction of the first projection spot in the obtained images of the calibration board;
  determining geometric information associated with a cone of light projected by the projector which forms the first projection spot in each of the plurality of images of the calibration board; and
  generating a projection spot map which indicates, at least, information usable to determine a real-world location of the first projection spot as depicted in an image obtained by the image sensor;
  obtaining a plurality of images of a real-world object, the images being obtained from the plurality of image sensors, and the images depicting projection spots projected onto the real-world object via the plurality of projectors;

accessing the projection spot map, the projection spot map including information usable to determine real-world locations of the projection spots based on depictions of the projection spots in the obtained images;

assigning location information to the projection spots based on the projection spot map; and causing generation of a three-dimensional representation of the real-world object.

11. The method of claim 10, wherein the projection spot map indicates information usable to determine real-world locations of the plurality of projection spots as depicted in images obtained by the image sensor.

12. The method of claim 10, wherein identifying a three-dimensional position associated with a depiction of the first projection spot comprises:

identifying a two-dimensional position associated with the first projection spot; and based on camera parameters associated with the image sensor, identifying the three-dimensional position.

13. The method of claim 10, wherein geometric information for the cone of light includes a vector centered at an origin of the projector, the vector defining propagation of the cone of light.

14. The method of claim 10, wherein determining geometric information comprises:

fitting a line through a center of the three-dimensional positions associated with each depiction of the first projection spot, the line defining an axis of the cone of light.

* * * * *